United States Patent
Schmidt et al.

(10) Patent No.: US 9,390,548 B2
(45) Date of Patent: Jul. 12, 2016

(54) THREE-DIMENSIONAL VOLUME RENDERING USING AN IN-MEMORY DATABASE

(71) Applicant: SAP SE, Walldorf (DE)

(72) Inventors: Olaf Schmidt, Walldorf (DE); Jason Kafka, Leimen (DE); Philipp Thun, Hirschberg a.d. Bergstr (DE)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 14/305,647

(22) Filed: Jun. 16, 2014

(65) Prior Publication Data

US 2015/0363962 A1 Dec. 17, 2015

(51) Int. Cl.
| | |
|---|---|
| *G06T 15/08* | (2011.01) |
| *G06T 17/00* | (2006.01) |
| *G06T 1/60* | (2006.01) |
| *G06T 11/40* | (2006.01) |
| *G06F 17/30* | (2006.01) |

(52) U.S. Cl.
CPC .......... *G06T 15/08* (2013.01); *G06F 17/30271* (2013.01); *G06T 1/60* (2013.01); *G06T 11/40* (2013.01); *G06T 17/00* (2013.01)

(58) Field of Classification Search
CPC ............ G06T 2207/10024; G06T 15/04; G06T 15/50; G06T 1/60; G06T 17/00; G06T 15/506; G06T 15/08; G06T 2207/30004; G06T 11/40; G06T 11/00
See application file for complete search history.

(56) References Cited

U.S. PATENT DOCUMENTS

| | | | |
|---|---|---|---|
| 5,933,146 A * | 8/1999 | Wrigley | .......................... 345/420 |
| 7,707,176 B2 | 4/2010 | Schmidt | |
| 7,827,160 B2 | 11/2010 | Kuhr et al. | |
| 7,844,890 B2 | 11/2010 | Schmidt | |
| 7,975,013 B2 | 7/2011 | Schmidt | |
| 8,090,754 B2 | 1/2012 | Schmidt et al. | |
| 8,219,974 B2 | 7/2012 | Schmidt | |
| 8,484,206 B2 | 7/2013 | Schmidt et al. | |
| 8,635,684 B2 | 1/2014 | Thun | |
| 8,719,833 B2 | 5/2014 | Schmidt | |
| 2002/0005850 A1* | 1/2002 | Osborne | ................ G06T 15/005 345/424 |
| 2003/0034981 A1* | 2/2003 | Wada | ..................... G06T 11/001 345/581 |
| 2008/0154994 A1 | 6/2008 | Fischer et al. | |
| 2008/0243781 A1 | 10/2008 | Kuhr et al. | |
| 2008/0263007 A1 | 10/2008 | Schmidt | |
| 2009/0150168 A1 | 6/2009 | Schmidt | |
| 2009/0150906 A1 | 6/2009 | Schmidt et al. | |
| 2010/0287553 A1 | 11/2010 | Schmidt et al. | |
| 2012/0087564 A1* | 4/2012 | Tsujita | ................. A61B 8/0808 382/131 |
| 2012/0246130 A1 | 9/2012 | Schmidt | |
| 2014/0012767 A1 | 1/2014 | Schmidt | |
| 2014/0123263 A1 | 5/2014 | Thun | |
| 2014/0205168 A1* | 7/2014 | Kim | ......................... A61B 8/46 382/131 |

* cited by examiner

*Primary Examiner* — Jeffrey Chow
(74) *Attorney, Agent, or Firm* — Fish & Richardson P.C.

(57) ABSTRACT

The present disclosure describes methods, systems, and computer program products for three-dimensional (3D) volume rendering. One computer-implemented method includes receiving a rendering request for a volume rendering of data of a volume dataset, calling one or more database-layer rendering procedures to perform the rendering request, for each rendering procedure: retrieving data volume metadata consistent with the rendering request and retrieving data volume data consistent with rendering request, generating, by a computer and using the data volume metadata and data volume data, an image intensity buffer containing intensity and illumination data for image generation, and generating an image from the data contained in the image intensity buffer.

21 Claims, 9 Drawing Sheets

THREE-DIMENSIONAL VOLUME RENDERING USING AN IN-MEMORY DATABASE

BACKGROUND

In scientific visualization and computer graphics, volume rendering is a set of techniques used to display a two-dimensional (2D) projection of a three-dimensional (3D) discretely sampled data set. A typical 3D data set is a group of 2D "slice" images acquired by tools such as an X-ray computer tomography (CT), magnetic resonance imaging (MRI), a Micro-CT scanner, and/or other tools. Current systems for volume rendering utilize specialized graphics hardware to process the huge amount of data produced by scanners. Typically, an end-user needs access to specialized, expensive, high-end workstations in order to work with and/or volume render the scanned datasets; therefore limiting the use of 3D volume renderings to specialists and particular groups of researchers. This has the effect of dampening the utilization of highly relevant, useful, and/or valuable 3D renderings, for example in medical diagnostics (e.g., cancer detection, neurological studies, research, etc.), engineering, education, and the like.

SUMMARY

The present disclosure relates to computer-implemented methods, computer-readable media, and computer systems for three-dimensional (3D) volume rendering. One computer-implemented method includes receiving a rendering request for a volume rendering of data of a volume dataset, calling one or more database-layer rendering procedures to perform the rendering request, for each rendering procedure: retrieving data volume metadata consistent with the rendering request and retrieving data volume data consistent with rendering request, generating, by a computer and using the data volume metadata and data volume data, an image intensity buffer containing intensity and illumination data for image generation, and generating an image from the data contained in the image intensity buffer.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the rendering request is received by a database-layer volume rendering service.

A second aspect, combinable with any of the previous aspects, wherein the one or more database-layer rendering procedures are called by the volume rendering service.

A third aspect, combinable with any of the previous aspects, wherein generating the image intensity buffer includes calling one or more database-layer stored procedures.

A fourth aspect, combinable with any of the previous aspects, wherein each stored procedure is called with a SQL statement.

A fifth aspect, combinable with any of the previous aspects, wherein the one or more database-layer stored procedures further calls one or more low level processes to perform high-computation processing functions.

A sixth aspect, combinable with any of the previous aspects, further comprising, for each pixel associated with the retrieved data volume data: calculating a pixel intensity value and using the pixel intensity, calculating a pixel illumination value.

The subject matter described in this specification can be implemented in particular implementations so as to realize one or more of the following advantages. First, specialized graphics hardware/software is not necessary to perform 3D volume renderings. The data and renderings are available to a wider audience to enhance and advance use for medical, engineering, education, and/or other purposes. Second, because specialized graphics hardware/software is not needed, the size of the datasets is not limited by graphics processing unit (GPU) texture memory, memory swapping, and/or database scaling issues. Effectively, datasets are capable of unlimited size. Third, the column store nature of the in-memory database allows highly efficient image generation and increase application speed for 3D volume rendering. The high efficiency/speed allows the 3D rendering application to be used in a dynamic environment (e.g., real-time or near real-time) without long downtimes for rendering data. In some instances, 3D volume rendering can occur as data changes to provide a real-time view with accompanying analytics of the state of an object, etc. The rendering component is SQL based and provided by use of stored procedures in structured query language (SQL) SQLSCRIPT and/or procedural languages such as "L" that embed data-intensive application logic directly into the database at the database layer. Access/processing of data is simplified by the use of SQL statements and the use of complex computational languages to perform rendering functions can be avoided. Fourth, as the algorithms are in the database layer itself, there is no need to transfer extensive data across networks to render on remote hardware/software apart from the database. Fifth, an available web-based user interface allows the use of the 3D volume rendering application using a browser and/or mobile devices in a cloud-based computing environment. Expensive, custom applications and/or custom hardware workstations are not necessary to work with the datasets and to perform 3D volume rendering. Sixth, the user interface allows the selection of volume datasets available in the database and the selection of various rendering methods (e.g., intensity calculation based on average, maximum, first hit, etc.) as well as zooming and coloring of detected characteristics in the dataset. The user interface also allows for automatic intensity scaling where intensities are scaled from intensities provided by scanner systems to display intensities to generate the actual image data. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
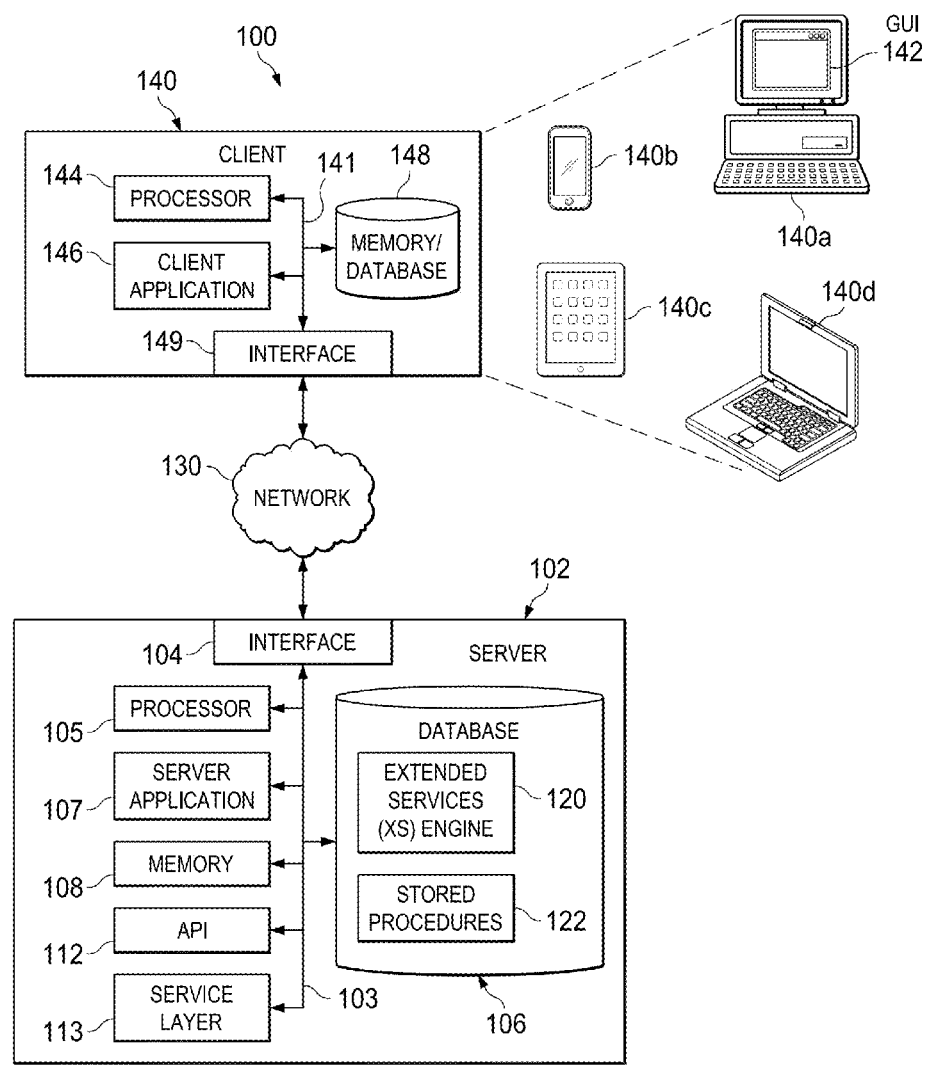
FIG. 1 is a block diagram illustrating an example distributed computing system (EDCS) for three-dimensional (3D) volume rendering according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, computer-program products, and systems for three-dimensional (3D) volume rendering implemented by moving complex rendering algorithms and functionality into the database layer of an in-memory database to provide, for example, the above-described and other advantages. Although the following description is focused on medical scanning/data sets and the use of an in-memory database, the described computer-implemented methods, computer-program products, and systems are also applicable to any type of use applicable to 3D volume rendering as well as the use of a conventional database (although performance would be degraded due to the operation of the conventional database). The focus on medical data sets used for 3D volume rendering is to enhance understanding of the described subject matter and is not meant to limit the applicability of the described subject matter only to medical data sets and particularly those datasets described.

In scientific visualization and computer graphics, volume rendering is a set of techniques used to display a two-dimensional (2D) projection of a three-dimensional (3D) discretely sampled data set. A typical 3D data set is a group of 2D "slice" images acquired by tools such as an X-ray computer tomography (CT), magnetic resonance imaging (MRI), a Micro-CT scanner, and/or other tools. Current systems for volume rendering utilize specialized graphics hardware to process the huge amount of data produced by scanners. Typically, an end-user needs access to specialized, expensive, high-end workstations in order to work with and/or volume render the scanned datasets; therefore limiting the use of 3D volume renderings to specialists and particular groups of researchers. This has the effect of dampening the utilization of highly relevant, useful, and/or valuable 3D renderings, for example in medical diagnostics (e.g., cancer detection, neurological studies, research, etc.), engineering, education, and the like.

Volume data sets from a scanned object are usually acquired in a regular pattern (e.g., one data "slice" every millimeter). A volumetric grid is generated, with each volume element (a "voxel") represented by a single value that is obtained by sampling the immediate area surrounding the voxel. A direct volume renderer requires every sample value to be mapped/composed to an opacity and a color (e.g., a red, green, blue, alpha (RGBA) value (or in some instances other value types)). This can be performed with a "transfer function" which can be a simple ramp, a piecewise linear function, and/or an arbitrary table. The composed RGBA value is projected on corresponding pixel of a frame buffer depending on the rendering technique used. The transfer function calculates a final color and a transparency of a pixel in a resulting image. The design of the transfer function depends heavily on what kind of visual effect should be achieved (e.g., one can choose to exclude certain voxels from a final image by using a piecewise linear function which maps certain values to not-visible and others to a defined color/opacity).

An in-memory database is a high-performance database management system (DBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations and in contrast to a conventional database, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database. In some implementations, the in-memory database can be coupled to a conventional database for various purposes such as backup, recovery, an interface, parallel processing, security, etc. In typical implementations, the described functionality is be performed by efficient structured query language (SQL) parallelization mechanisms on a column-store in-memory database (as opposed to a row-store operation on a conventional database).

FIG. 1 is a block diagram illustrating an example distributed computing system (EDCS) 100 for 3D volume rendering according to an implementation. The illustrated EDCS 100 includes or is communicably coupled with a server 102 and a client 140 (an example of a computing device as mentioned above) that communicate across a network 130. In some implementations, one or more components of the EDCS 100 may be configured to operate within a cloud-computing-based environment.

At a high level, the server 102 is an electronic computing device operable to receive, transmit, process, store, or manage data and information associated with the EDCS 100. In general, the server 102 is a server providing at least functionality for three-dimensional (3D) volume rendering. According to some implementations, the server 102 may also include or be communicably coupled with an e-mail server, a web server, a caching server, a streaming data server, a business intelligence (BI) server, and/or other server.

The server 102 is responsible for receiving and responding to, among other things, requests and/or content from one or more client applications 146 associated with the client 140 and other components of the EDCS 100 (see FIG. 2) and/or responding to the received requests and/or content. In some implementations, the server 102 processes the requests at least in the database 106 and/or the server application 107. In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the server application 107, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required for 3D volume rendering.

The server 102 also includes a database 106 that holds data for the server 102, client 140, and/or other components of the EDCS 100. In typical implementations, the database 106 is an in-memory database. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. In some implementations, database 106 can be configured to store one or more instances of and/or some or all data for an eXtended Services (XS) engine 120 (described in relation to FIG. 2), stored procedures 122 (described in relation to FIG. 2), and/or other appropriate data (e.g., user profiles, objects and content, client data, etc.).

The server application 107 is an algorithmic software engine capable of providing, among other things, any function consistent with this disclosure for 3D volume rendering, for example receiving one or more requests from a client 140, relaying the request to the database 106, and relaying response data to the client 140 response to the received one or more requests, providing administrative functionality for the server 102 (e.g., particularly with respect to the database 106 and with respect to functionality for 3D volume rendering). In some implementations, the server application 107 can provide and/or modify content provided by and/or made available to other components of the EDCS 100. In other words, the server application 107 can act in conjunction with one or more other components of the server 102 and/or EDCS 100 in responding to a request received from the client 140 and/or other component of the EDCS 100.

Although illustrated as a single server application 107, the server application 107 may be implemented as server applications 107. In addition, although illustrated as integral to the server 102, in alternative implementations, the server application 107 can be external to the server 102 and/or the EDCS 100 (e.g., wholly or partially executing on the client 140, other server 102 (not illustrated), etc.). Once a particular server application 107 is launched, the particular server application 107 can be used, for example by an application or other component of the EDCS 100 to interactively process received requests. In some implementations, the server application 107 may be a network-based, web-based, and/or other suitable application consistent with this disclosure.

In some implementations, a particular server application 107 may operate in response to and in connection with at least one request received from other server applications 107, other components (e.g., software and/or hardware modules) associated with another server 102, and/or other components of the EDCS 100. In some implementations, the server application 107 can be accessed and executed in a cloud-based computing environment using the network 130. In some implementations, a portion of a particular server application 107 may be a web service associated with the server application 107 that is remotely called, while another portion of the database engine 107 may be an interface object or agent bundled for processing by any suitable component of the EDCS 100. Moreover, any or all of a particular server application 107 may be a child or sub-module of another software module or application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The client 140 may be any computing device operable to connect to and/or communicate with at least the server 102. In general, the client 140 comprises an electronic computing device operable to receive, transmit, process, and store any appropriate data associated with the EDCS 100, for example, the server application 107. More particularly, among other things, the client 140 can collect content from the client 140 and upload the collected content to the server 102 for integration/processing into/by the server application 107 and/or database 106. The client typically includes a processor 144, a client application 146, a memory/database 148, and/or an interface 149 interfacing over a system bus 141.

The client application 146 is any type of application that allows the client 140 to navigate to/from, request, view, create, edit, delete, administer, and/or manipulate content associated with the server 102 and/or the client 140. For example, the client application 146 can present GUI displays and associated data to a user generated by the server application 107 and/or database 106, accept user input, and transmit the user input back to the server 102 for dissemination to the appropriate components of server 102, in particular the server application 107 and/or the database 106. In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a particular request to the server 102.

In some implementations, the client application 146 can also be used perform administrative functions related to the server application 107 and/or database 106. For example, the server application 107 and/or database 106 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to send requests to the server 102 and to receive and process responses from the server 102.

The memory/database 148 typically stores objects and/or data associated with the purposes of the client 140 but may also be consistent with the above-described database 106 of the server 102 or other memories within the EDCS 100 and be used to store data similar to that stored in the other memories of the EDCS 100 for purposes such as backup, caching, and the like.

Further, the illustrated client 140 includes a GUI 142 that interfaces with at least a portion of the EDCS 100 for any suitable purpose. For example, the GUI 142 (illustrated as associated with client 140a) may be used to view data associated with the client 140, the server 102, or any other component of the EDCS 100. In particular, in some implementations, the client application 146 may render GUI interfaces and/or content for GUI interfaces received from the server application 107 and/or database 106.

There may be any number of clients 140 associated with, or external to, the EDCS 100. For example, while the illustrated EDCS 100 includes one client 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140a-140d) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140a).

Figure 2:
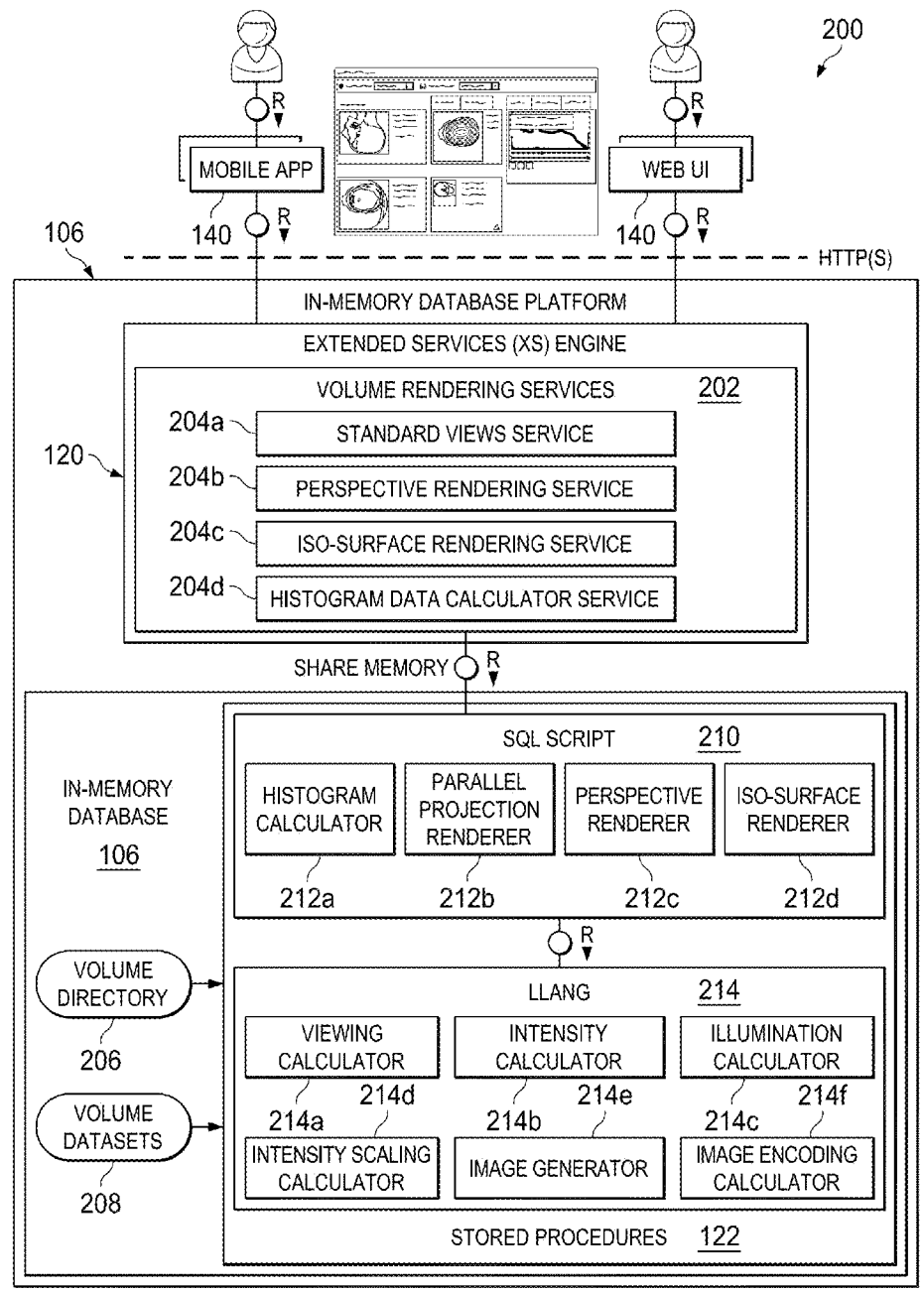
FIG. 2 is a block diagram illustrating a lower-level view of the database of FIG. 1 according to an implementation.

FIG. 2 is a block diagram 200 illustrating a lower-level view of the database 106 (database layer) of FIG. 1 according to an implementation. The XS Engine 120 in the XS engine layer provides services for volume rendering. For example, volume rendering services 202 can include a standard views service 204a, perspective rendering service 204b, ISO-surface rendering service 204c, and histogram data calculator service 204d. In other implementations, more or less services consistent with this disclosure can also be included in the volume rendering services 202. In some implementations:

- The standard views service 204a calculates images for viewer directions along the major coordinate axes. Typically, the volume cannot be rotated in this viewing mode.
- The perspective rendering service 204b calculates images for volume data sets, which are arbitrarily rotated and translated. Typically, this service implements a classic viewing pipeline required for rendering 2D projections of 3D scenes.
- The ISO-surface rendering service 204c only renders voxels with a given intensity. Hence, for an ISO-surface, all voxels on the surface have the same intensity value. In order to visualize them, an illumination calculation system can be leveraged (see below).
- The histogram data calculator service 204d is needed to calculate how many voxels with a certain gray-value are present in a volume. Among internal statistical operations, the histogram data calculator service is needed for user defined transfer functions, where the user can clip away voxel values in order to highlight/segment parts of the volume data set (e.g., only show bones, teeth, liver etc.).

The in-memory database 106 includes a volume directory 206, volume datasets 208, and stored procedures 122. The volume directory 206 contains a directory of available datasets for rendering. The volume datasets 206 are typically created by scanning equipment as described above (e.g., CT, MRI, etc.). The volume datasets 206 are in the form of a data cube (e.g., a three or higher dimensional array of values commonly used to describe a time series of image data) including a multitude of sample points generated by the above-described scanning equipment hardware.

In the illustrated XS engine 120, the stored procedures 122 include both SQLSCRIPT procedures 210 and L-language (LLANG) procedures 214 used, for example, to process, extract, visualize (generate images), analyze etc. data from the volume datasets 208. For example, a user may wish to extract a scanned region of a human head from a data cube and perform analysis on the extracted data. The stored procedures 122 can be used to do so. In some implementations, one or more patterns can be extracted from the volume datasets 208 and be used to perform pattern matching, predictive analysis, and other functions. In other implementations, the stored procedures can be written in any appropriate language or format consistent with this disclosure.

In the illustrated stored procedures 122, the SQLSCRIPT procedures 212 can include a histogram calculator 212a, parallel projection renderer 212b, perspective renderer 212c, and/or an ISO-surface renderer 212d. In some implementations:

The histogram calculator 212a uses SQL aggregate functions to count and classify voxel intensities. It can also perform, if needed, a mapping from a source data range to a specified destination data range (e.g., a source could be 16-bit gray-value resolution and a target could be defined as 8-bit gray-value resolution.)

The parallel projection renderer 212b uses plain SQL statements for implementing a basic ray-casting along the major coordinate system axis.

The perspective renderer 212c implements the complete viewing pipeline (view-model transform, viewport mapping). Matrix multiplication is done in LLANG, the results are passed back to SQL.

The ISO-surface renderer 212d calculates the ISO-surface for a given intensity value along one the major coordinate axes and utilizes illumination calculator 214c to show an highlight features on the ISO-surface.

The LLANG procedures 214 are lower-level code procedures that can be called by SQL stored procedures (e.g., the SQLSCRIPT procedures 212) to perform particular "heavy-weight" (high computational) functions. The LLANG procedures 214 can include procedures for viewing calculator 214a, intensity calculator 214b, illumination calculator 214c, intensity scaling calculator 214d, image generator 214e, and/or image encoding calculator 214f. In some implementations (for the illumination calculator 214c) for a correct viewer-direction-dependent illumination, several factors must be calculated. Additional sample points must be acquired using, for example, tri-linear interpolation, and intersection points must be computed. Note that these are complex operations and cannot be done with the SQL language. The results are calculated in the L LANG layer and are passed back to the SQL layer.

Figure 3:
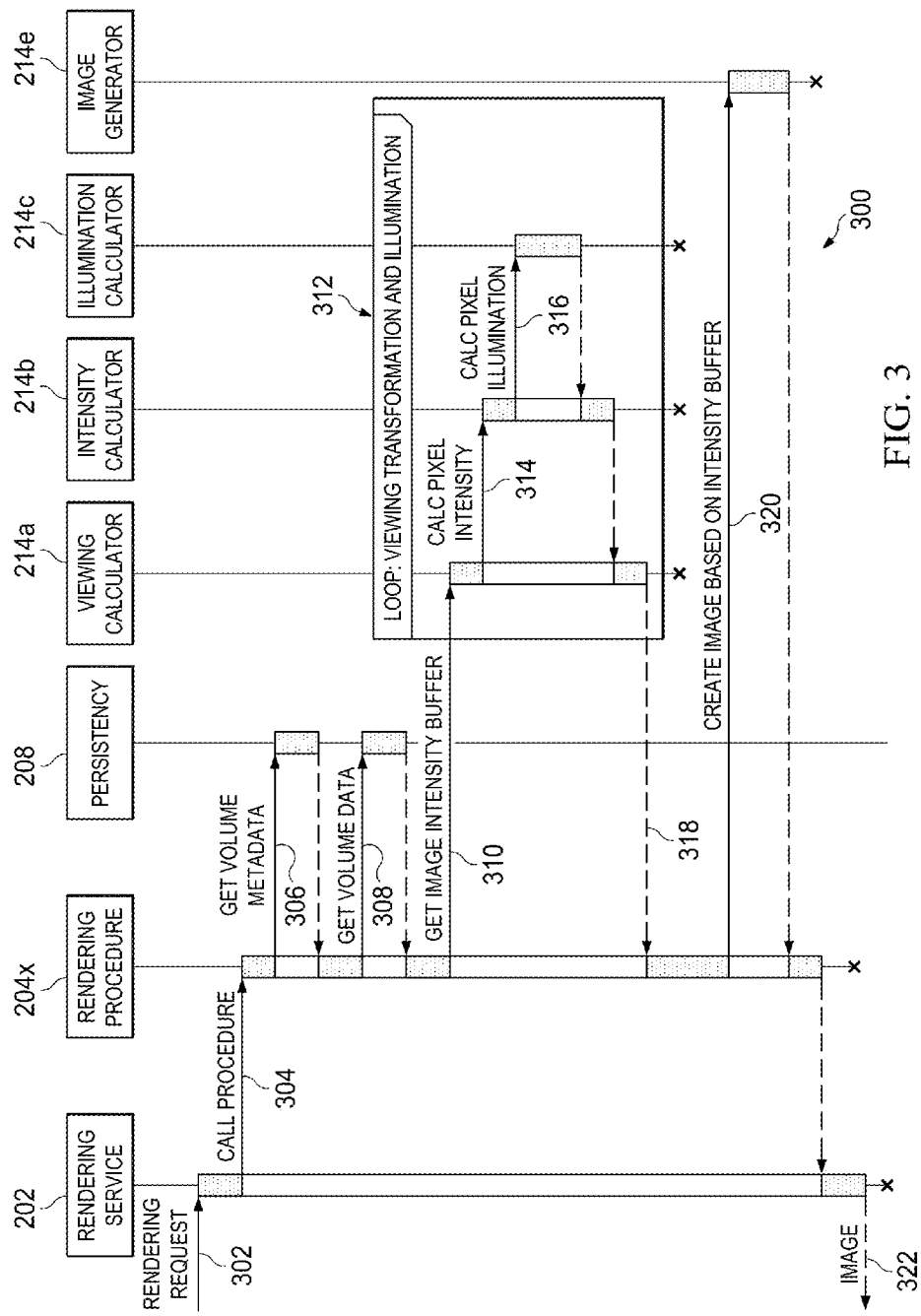
FIG. 3 is a flow chart illustrating 3D volume rendering according to an implementation.

FIG. 3 is a flow chart 300 illustrating 3D volume rendering according to an implementation. For clarity of presentation, the description that follows generally describes flow 300 in the context of FIGS. 1-2, and 4-8 and 9A-9B. However, it will be understood that flow 300 may be performed, for example, by any other suitable system, environment, software, and hardware, or a combination of systems, environments, software, and hardware as appropriate. In some implementations, various steps of flow 300 can be run in parallel, in combination, in loops, and/or in any order.

At 302, a rendering request (e.g., in hypertext transfer protocol (HTTP)—but any protocol is envisioned as acceptable) is received by the volume rendering services 202 for a rendered image. The GUI that issued the request will expect an image to be return in response to the rendering request. The XS Engine 120 volume rendering service 202 analyzes the received request to determine a particular rendering service(s) to be leveraged (e.g., for rendering a histogram using the histogram data calculator service 204d). From 302, flow 300 proceeds to 304.

At 304, the particular rendering procedure(s) determined from the rendering request is called (e.g., the histogram data calculator service 204d). From 304, flow 300 proceeds to 306.

At 306, volume metadata is retrieved from the persistency (volume datasets 208) using the volume directory 206 to locate the appropriate volume metadata. For example, metadata related to stored medical data (e.g., models of brain, head, etc.), engineering data (e.g., engines, etc.), data format (e.g., RAW, etc.), size in X, Y, and Z-axis directions, number of sample points, sample distance, patient name, etc. From 306, flow 300 proceeds to 308.

At 308, the rendering procedure(s) retrieves volume data from the persistency using the volume directory 206 to locate the data. From 308, flow 300 proceeds to 310.

At 310, the rendering procedure(s) calls appropriate stored procedure(s) 122 to perform the requested rendering (e.g., the histogram calculator 212a in the SQLSCRIPT stored procedures 210). The data is operated on using SQL statements. For example, in the illustrated example, the rendering procedure generates an image intensity buffer by executing SQLSCRIPT 212 procedures/LLANG procedures 214 in a loop 312 to create intensity buffer data from the volume dataset 208. An image intensity buffer is requested from an instance of the viewing calculator 214a. Note that the viewing calculator 214a in FIG. 2 is a stored procedure that performs one particular step of viewing calculations. For example, during this step, 3D coordinates of an object in an object space are transformed/mapped to an image space (2D). This can be compared to a camera model, where the objects of the real world environment (3D) are mapped/projected onto the film (negative) which is the base for a final image. The image intensity buffer is a data structure (e.g., an array and/or other data structure) which stores calculated intensity values (e.g., performed by intensity calculator 214b of FIG. 2). The intensity buffer is transferred between several stored procedures to calculate a final image to display (e.g., typically all components of the LLANG 214 of FIG. 2). The viewing calculator 214a is able to create a view of image data from an "eye point" in 3D space. For example, if a user was slightly back and to the left of a scanned object, the eye point would be in this position looking in the direction of the scanned object and the viewing calculator 214a would be responsible to calculate at least the pixel intensity and pixel illumination for all pixels in the portion of the volume dataset 208 applicable to the requested rendering. Note that there is space/distance between sample points in the scanned volume dataset and interpolation from both the pixel intensity and pixel illumination (both described below) must also be taken into account and projected to "fill" in the space around each sample point.

In more detail, an intensity buffer stores calculated intensity-values for each pixel in an image space. Usually intensities are in a range (e.g., [0, Max-Intensity]) where 0 means no intensity (or translated to background color). The intensity buffer is calculated by projecting the model (e.g., a 3D scan) into the image space by taking into account an actual position of the observer (eye) and a viewing direction. This is actually a camera model where the camera observes a 3D environment and the picture is a 2D projection of the real environment. In the case of the volume data visualization, the intensity values are the scanned intensities (e.g., as measured by a scanner—MRT, CT, etc.). The scanner produces a 3D model of the scanned object where the intensities are stored in a 3D cube (voxels). During perspective rendering, these intensity values are projected on 2D plane (e.g., a viewing plane which is rasterized in pixels arranged in rows and columns). At the end of the projection phase, the intensity-buffer stores the intensity values for visible parts of the scanned object from a give perspective. These intensities are then translated into color values based on a given color model (e.g., RGB or other color model). These calculated pixel color values are then encoded into a specified image file format (e.g., BMP, JPEG, TIF, PNG, etc.) by Imaging Encoding module 214f. Note that with respect to FIG. 2, an intensity calculation is a combination of the viewing calculator 214a (projection), intensity calculator 214b (interpolation of intensity values), and the intensity scaling calculator 214d. Intensity scaling is used to map between a source gray-value range and a target gray-value range. For example, if a the volume data set created by the scanner has a 16-bit resolution, but a final image can only be displayed with a resolution of 8-bit, then a mapping needs to be performed between the different intensity value ranges (gray-value ranges). This mapping is performed by the intensity scaling module 214d. From 312, flow 300 proceeds to 314.

At 314, the intensity of each pixel (to distinguish/match it with other associated pixels) in the requested portion of the volume dataset is calculated by the intensity calculator 214b. Each sample point created by a scanner (e.g., a CT scanner) has a particular intensity value associated with it (e.g., due to the absorption of X-rays in the case of the CT scanner) that is mapped, for example, to a gray value for display. For example, intensity might be a float value from 0 to 1 (as 8, 16, 32-bit values, etc.) but it could be any value.

Figure 4:
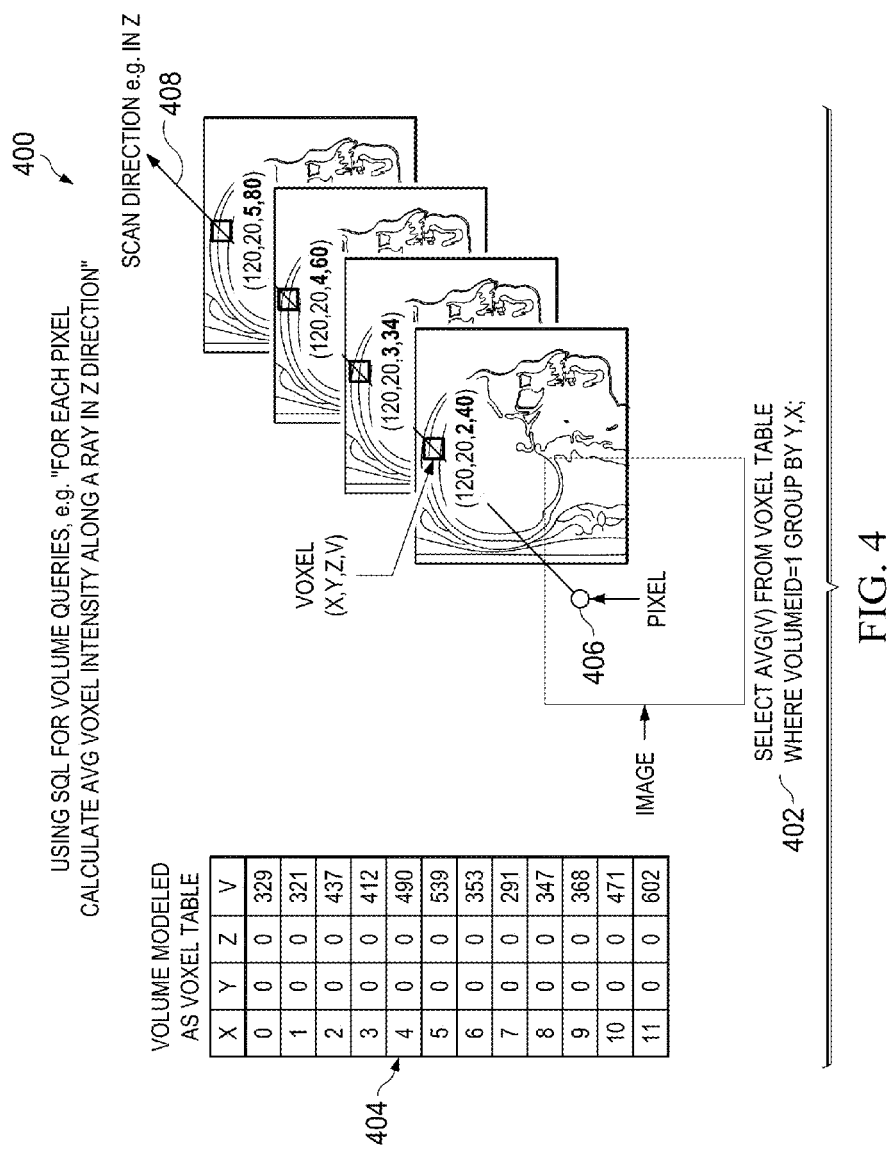
FIG. 4 illustrates an example of using SQL to calculate average voxel intensity along a scanning ray path according to an implementation.

Referring to FIG. 4, FIG. 4 illustrates an example 400 of using SQL to calculate average voxel intensity along a scanning ray path according to an implementation. In the provided example, intensity values are calculated for three main viewing axes (top, front, side).

In some implementations, the following SQLSCRIPT calculates the intensities based on the maximum intensity approach:

```
IF PERSPECTIVE = 'FRONT' THEN
    DATA_INTENSITIES = SELECT TO_DECIMAL(MAX(V)) as INTENSITY FROM
"VOXEL_SCHEMA"."volumerenderer.data::volumes"
where "VOLUMEID" = :VOLUMEID group by X, Y ORDER BY Y, X;
ELSEIF PERSPECTIVE = 'TOP' THEN
    DATA_INTENSITIES = SELECT TO_DECIMAL(MAX(V)) as INTENSITY FROM
"VOXEL_SCHEMA"."volumerenderer.data::volumes"
where "VOLUMEID" = :VOLUMEID group by Z, X ORDER BY Z DESC, X;
ELSEIF PERSPECTIVE = 'SIDE' THEN
    DATA_INTENSITIES = SELECT TO_DECIMAL(MAX(V)) as INTENSITY FROM
"VOXEL_SCHEMA"."volumerenderer.data::volumes"
where "VOLUMEID" = :VOLUMEID group by Y, Z ORDER BY Y, Z;
END IF.
```

In some implementations, the following SQLSCRIPT calculates the intensities based on the average intensity approach (X-ray type images):

```
IF PERSPECTIVE = 'FRONT' THEN
    DATA_INTENSITIES = SELECT AVG(V) as INTENSITY FROM
"VOXEL_SCHEMA"."volumerenderer.data::volumes" where
"VOLUMEID" = :VOLUMEID group by X, Y ORDER BY Y, X;
ELSEIF PERSPECTIVE = 'TOP' THEN
    DATA_INTENSITIES = SELECT AVG(V) as INTENSITY FROM
"VOXEL_SCHEMA"."volumerenderer.data::volumes" where
"VOLUMEID" = :VOLUMEID group by Z, X ORDER BY Z DESC, X;
ELSEIF PERSPECTIVE = 'SIDE' THEN
    DATA_INTENSITIES = SELECT AVG(V) as INTENSITY FROM
"VOXEL_SCHEMA"."volumerenderer.data::volumes" where
"VOLUMEID" = :VOLUMEID group by Y, Z ORDER BY Y, Z;
END IF.
```

The calculations are performed for a volume specified by a volume-id 402 (here "1"). The intensity values V 404 for each pixel 406 (values+intensity illustrated in the table associated with 404) are generated by a scanner such as a PET, MRT, CT, MRI, etc. and stored for so called voxels specified by the coordinates (X, Y, Z) in 3D space. Generally, the algorithms operate as follows: "for each pixel in the final image, orient a ray perpendicular to the image plane through the volume layers. Along the ray collect sample values and perform an operation on the sample values. The resulting value is used as color value for the pixel in the resulting image." The algorithm itself is encapsulated in the SQL statement.

For example, if the scanner produces a scan with resolution 256×256×128, there can be 128 intensity layers where each layer contains 256×256 intensity values. The voxels form a 3D data cube and the observer can look at the model along the X, Y, or Z-axis 408. The intensity values can be calculated by using specified SQL-statements and, based on the calculated intensities; the final image (e.g., .PNG, .BMP, .JPG) is (as described below) calculated and passed back to a GUI for display.

Note that perspective- and ISO-rendering require more sophisticated algorithms that are implemented deeper in the database layer as previously-described LLANG procedures (e.g., LLANG 214) as SQL-statements alone are not sufficient to perform these calculations. Returning to FIG. 3, From 314, flow 300 proceeds to 316.

Figure 5:
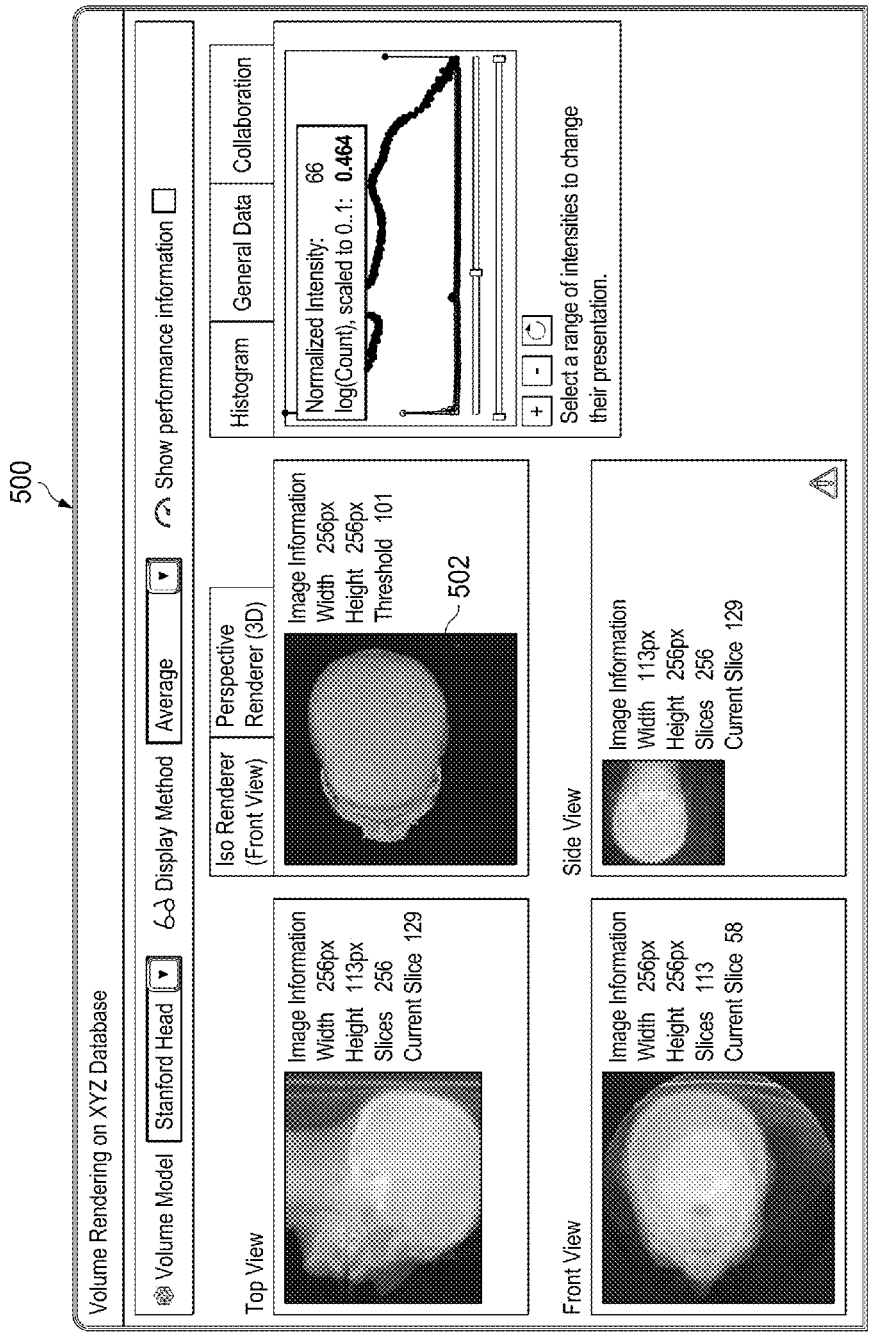
FIG. 5 illustrates pixel illumination according to an implementation.

At 316, the pixel illumination value for the pixel of 314 is calculated by the illumination calculator 214c. The illumination values are used to highlight a shape to provide a simulated lighting. The illumination calculator takes the intensity value and performs a gradient calculation to generate geometric vectors to perform a basic illumination. Referring to FIG. 5, FIG. 5 illustrates pixel illumination 500 according to an implementation. For example, image 502 is generated by an ISO Renderer as a perspective 3D view. The illumination of each pixel is calculated to simulate lighting from the upper area of the skull (right side of the head) which causes shading on various parts of the skull surface.

Returning to FIG. 3, after the pixel illumination value is determined, it is determined if another pixel is to be processed. If there are additional pixels, they are processed according to 314 and 316. If there are no further pixels to be processed, the intensity buffer is returned to the rendering procedure at 318. From 318, flow 300 proceeds to 320.

At 320, an image is created from the intensity buffer by the image generator 214e. The image generator 214e encodes the pixel intensities and pixel illumination values into an image format and returns the encoded image to the rendering service 202 where it is returned to the rendering requestor at 322. In some implementations, a bitmap (.BMP) formatted image file is returned. In other implementations, any other (including more than one) image formatted file may be returned to the requestor. After 322, flow 300 stops.

The volume rendering system supports different visualization modes for various use cases. As a result, corresponding intensities are efficiently calculated by the volume rendering system depending on the following (or other) visualization modes. The following examples do not represent all possible rendering modes and are presented not to limit but to help with understanding of the described subject matter.

Figure 6:
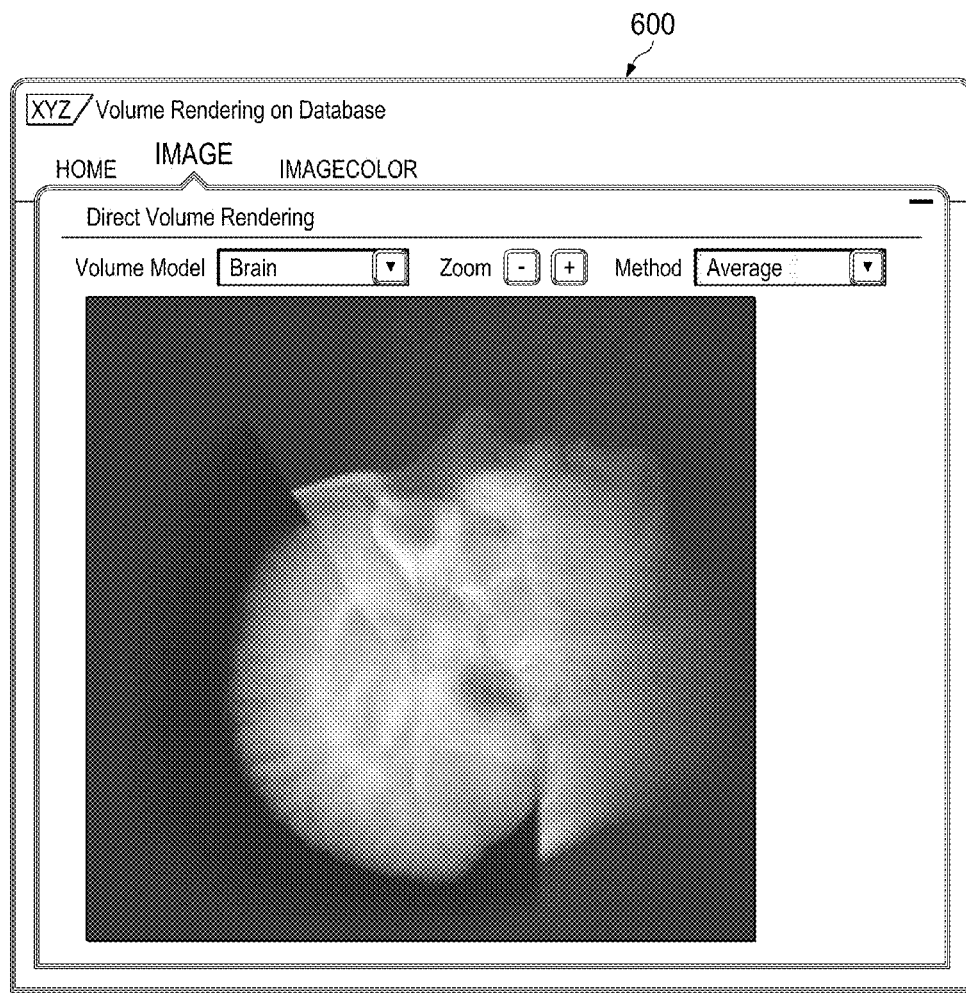
FIG. 6 is an example of a visualization based on an average of scanned voxel intensities (X-ray mode) according to an implementation.

For example, referring to FIG. 6, FIG. 6 is an example of a visualization 600 based on an average of scanned voxel intensities (X-ray mode) according to an implementation (see also the average intensity approach SQL example above).

Figure 7:
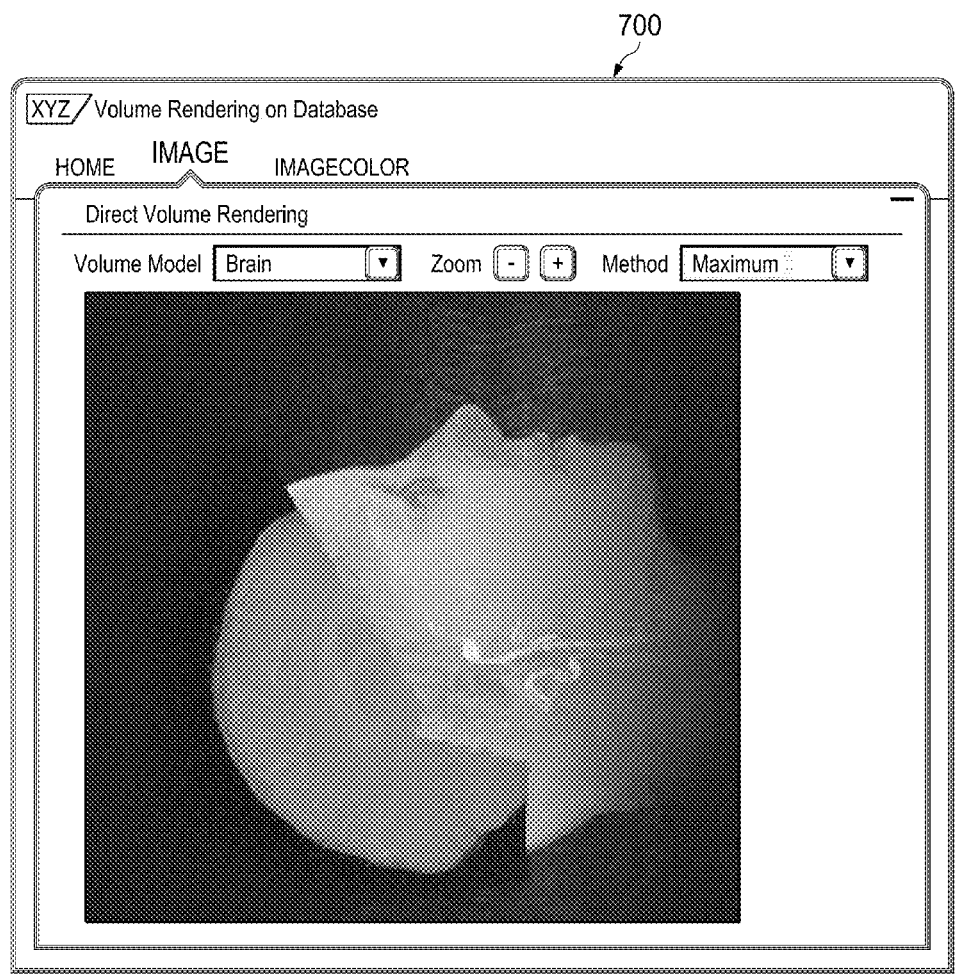
FIG. 7 is an example of visualization based on a maximum of scanned voxel intensities according to an implementation.

FIG. 7 is an example of visualization 700 based on a maximum of scanned voxel intensities according to an implementation (see also the maximum intensity approach SQL example above).

Figure 8:
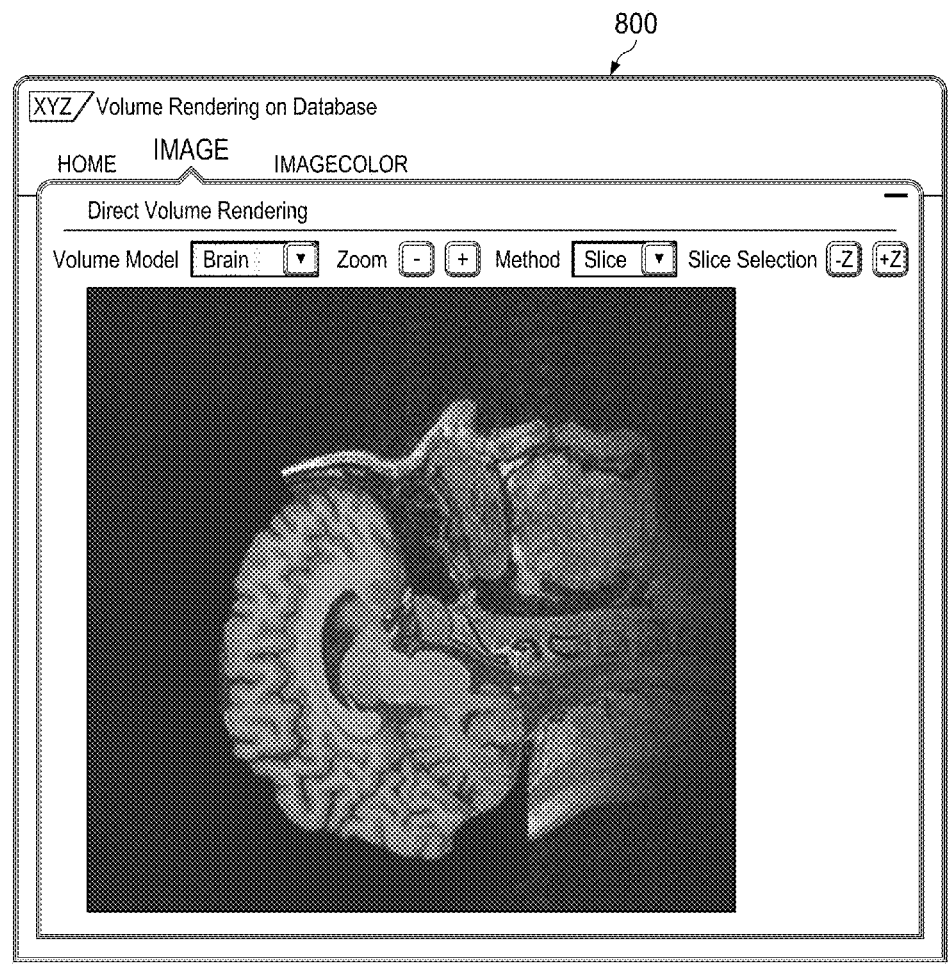
FIG. 8 is an example of visualization based on slices of a volume according to an implementation.

FIG. 8 is an example of visualization 800 based on slices of a volume according to an implementation. As can be seen, the image is as if a slice was removed from a human head and viewed to show brain structure, bone, etc.

Figure 9B:
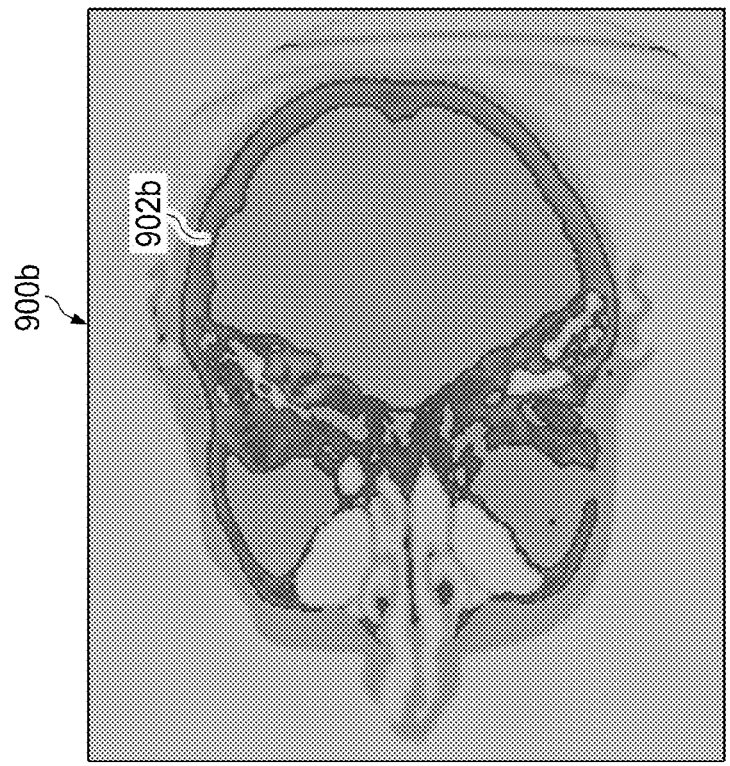
FIGS. 9A and 9B are examples of visualizations coloring regions of interest according to an implementation.
Figure 9A:
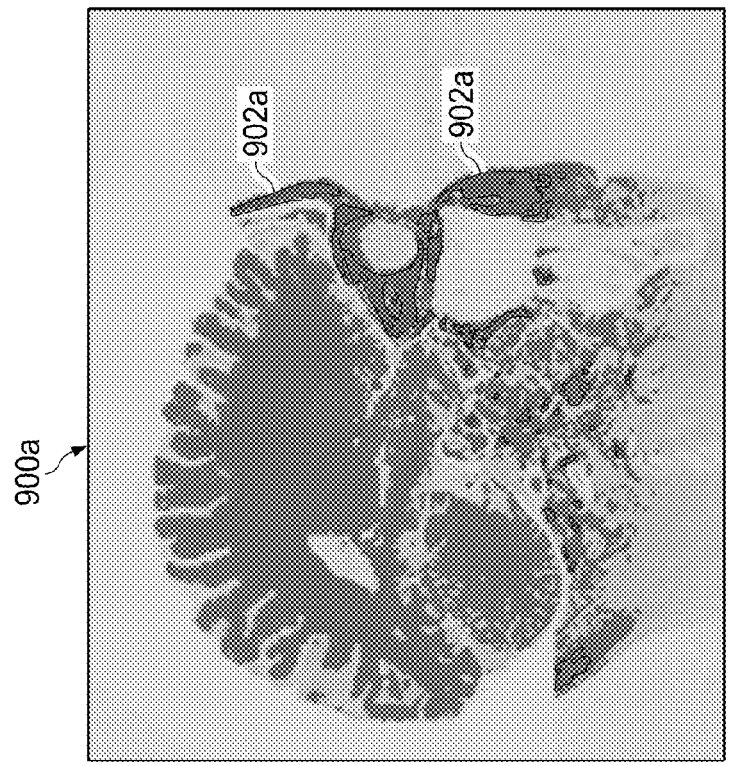

FIGS. 9A and 9B are examples of visualizations 900a and 900b coloring regions of interest according to an implementation. Colorization is performed by choosing intensities of specific values and mapping the intensities to particular colors. Although illustrated in black and white with various shading and/or patterns, as can be seen in FIG. 9A, bone structure 902a in the slice image can be visually displayed in color (e.g., green or other color) to make it stand out. Similarly in FIG. 9B, bone structure 902b from the top view can be visually displayed in color (e.g., red or other color) to make it stand out.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a rendering request for a volume rendering of data of a three-dimensional volume dataset;
calling one or more database-layer rendering procedures to perform the rendering request;
for each rendering procedure:
retrieving data volume metadata consistent with the rendering request; and
retrieving data volume data consistent with rendering request;
generating, by a computer and using the data volume metadata and data volume data, an image intensity buffer for image generation storing intensity and illumination data for each pixel of the three-dimensional volume dataset, an intensity value of each pixel determined by a combination of a projection calculation by a viewing calculator, an interpolation of intensity value by an intensity calculator, and an intensity scaling by an intensity scaling calculator, the determined intensity value of each pixel projected into a two-dimensional image space taking into account an actual position of an observer and a viewing direction, and the illumination data calculated for each pixel using a gradient calculation generating geometric vectors; and
generating an image from the pixel intensity and illumination data contained in the image intensity buffer.

2. The method of claim 1, wherein the rendering request is received by a database-layer volume rendering service.

3. The method of claim 2, wherein the one or more database-layer rendering procedures are called by the volume rendering service.

4. The method of claim 1, wherein generating the image intensity buffer includes calling one or more database-layer stored procedures.

5. The method of claim 4, wherein the one or more database-layer stored procedures further calls one or more low level processes to perform high-computation processing functions.

6. The method of claim 1, further comprising, for each pixel associated with the retrieved data volume data:
calculating a pixel intensity value; and
using the pixel intensity, calculating a pixel illumination value.

7. The method of claim 1, wherein the intensity values stored in the intensity buffer correspond to visible parts of the three-dimensional volume dataset from the perspective of the actual position of the observer and the viewing direction.

8. A non-transitory, computer-readable medium storing computer-readable instructions executable by a computer and configured to:
receive a rendering request for a volume rendering of data of a three-dimensional volume dataset;
call one or more database-layer rendering procedures to perform the rendering request;
for each rendering procedure:
retrieve data volume metadata consistent with the rendering request; and
retrieve data volume data consistent with rendering request;
generate, by a computer and using the data volume metadata and data volume data, an image intensity buffer for image generation storing intensity and illumination data for each pixel of the three-dimensional volume dataset, an intensity value of each pixel determined by a combination of a projection calculation by a viewing calculator, an interpolation of intensity value by an intensity calculator, and an intensity scaling by an intensity scaling calculator, the determined intensity value of each pixel projected into a two-dimensional image space taking into account an actual position of an observer and a viewing direction, and the illumination data calculated for each pixel using a gradient calculation generating geometric vectors; and
generate an image from the pixel intensity and illumination data contained in the image intensity buffer.

9. The medium of claim 8, wherein the rendering request is received by a database-layer volume rendering service.

10. The medium of claim 9, wherein the one or more database-layer rendering procedures are called by the volume rendering service.

11. The medium of claim 8, wherein generating the image intensity buffer includes calling one or more database-layer stored procedures.

12. The medium of claim 11, wherein the one or more database-layer stored procedures further calls one or more low level processes to perform high-computation processing functions.

13. The medium of claim 8, further comprising, for each pixel associated with the retrieved data volume data, instructions to:
calculate a pixel intensity value; and
using the pixel intensity, calculate a pixel illumination value.

14. The medium of claim 8, wherein the intensity values stored in the intensity buffer correspond to visible parts of the three-dimensional volume dataset from the perspective of the actual position of the observer and the viewing direction.

15. A system, comprising:
a memory;
at least one hardware processor interoperably coupled with the memory and configured to:
receive a rendering request for a volume rendering of data of a three-dimensional volume dataset;
call one or more database-layer rendering procedures to perform the rendering request;
for each rendering procedure:
retrieve data volume metadata consistent with the rendering request; and
retrieve data volume data consistent with rendering request;
generate, by a computer and using the data volume metadata and data volume data, an image intensity buffer for image generation storing intensity and illumination data for each pixel of the three-dimensional volume dataset, an intensity value of each pixel determined by a combination of a projection calculation by a viewing calculator, an interpolation of intensity value by an intensity calculator, and an intensity scaling by an intensity scaling calculator, the determined intensity value of each pixel projected into a two-dimensional image space taking into account an actual position of an observer and a viewing direction, and the illumination data calculated for each pixel using a gradient calculation generating geometric vectors; and
generate an image from the pixel intensity and illumination data contained in the image intensity buffer.

16. The system of claim 15, wherein the rendering request is received by a database-layer volume rendering service.

17. The system of claim 16, wherein the one or more database-layer rendering procedures are called by the volume rendering service.

18. The system of claim 15, wherein generating the image intensity buffer includes calling one or more database-layer stored procedures.

19. The system of claim 18, wherein the one or more database-layer stored procedures further calls one or more low level processes to perform high-computation processing functions.

20. The system of claim 15, further configured, for each pixel associated with the retrieved data volume data, to:
   calculate a pixel intensity value; and
   using the pixel intensity, calculate a pixel illumination value.

21. The system of claim 15, wherein the intensity values stored in the intensity buffer correspond to visible parts of the three-dimensional volume dataset from the perspective of the actual position of the observer and the viewing direction.

\* \* \* \* \*